(12) United States Patent
Lee

(10) Patent No.: US 8,667,242 B2
(45) Date of Patent: Mar. 4, 2014

(54) DATA ACCESS METHOD AND SYSTEM, STORAGE MEDIUM CONTROLLER AND STORAGE SYSTEM

(75) Inventor: Chien-Fu Lee, Yunlin County (TW)

(73) Assignee: Phison Electronics Corp., Miaoli (TW)

( * ) Notice: Subject to any disclaimer, the term of this patent is extended or adjusted under 35 U.S.C. 154(b) by 945 days.

(21) Appl. No.: 12/786,789

(22) Filed: May 25, 2010

(65) Prior Publication Data

US 2011/0252209 A1 Oct. 13, 2011

(30) Foreign Application Priority Data

Apr. 12, 2010 (TW) ................................ 99111259 A

(51) Int. Cl.
*G06F 13/00* (2006.01)
(52) U.S. Cl.
USPC ........................................................ 711/163
(58) Field of Classification Search
None
See application file for complete search history.

(56) References Cited

U.S. PATENT DOCUMENTS

2008/0147964 A1* 6/2008 Chow et al. ................... 711/103
2010/0306848 A1* 12/2010 Gellerich ......................... 726/24

FOREIGN PATENT DOCUMENTS

| CN | 101571833 | 11/2009 |
|----|-----------|---------|
| CN | 101632083 | 1/2010 |
| TW | I257039 | 6/2006 |
| TW | 200703055 | 1/2007 |
| TW | 200945037 | 11/2009 |

OTHER PUBLICATIONS

"First Office Action of China counterpart application" issued on Feb. 27, 2013, p. 1-p. 7.
"Office Action of Taiwan Counterpart Application", issued on May 29, 2013, p. 1-p. 12.

* cited by examiner

*Primary Examiner* — Duc Doan
(74) *Attorney, Agent, or Firm* — J.C. Patents

(57) ABSTRACT

A data access method for writing data into a storage apparatus is provided, wherein the storage apparatus has a storage unit, the storage unit has a partition, the storage property of the partition is set as a write protect mode and the storage apparatus is coupled to a host system having an operation system. The data access method includes transmitting a command from the host system to the storage apparatus through a human interface device path and setting the storage property of the first partition as a writable mode in response the command. The data access method also includes storing data into the partition by using built-in commands of the operation system. Accordingly, the data access method can write data into a partition that has been at the write protect mode when a user logins the operation system with a limited user authority mode.

20 Claims, 7 Drawing Sheets

DATA ACCESS METHOD AND SYSTEM, STORAGE MEDIUM CONTROLLER AND STORAGE SYSTEM

CROSS-REFERENCE TO RELATED APPLICATION

This application claims the priority benefit of Taiwan application serial no. 99111259, filed on Apr. 12, 2010. The entirety of the above-mentioned patent application is hereby incorporated by reference herein and made a part of this specification.

BACKGROUND

1. Technology Field

The present invention relates to a data access method and system, and a memory controller and a memory storage system thereof and particularly to a data access method capable of accessing data in a partition being at a write protect mode under a limited user authority mode of an operation system, and a data access system, a storage medium controller and a storage system using the method.

2. Description of Related Art

When an external storage apparatus is coupled to a host system through a connector (e.g., an universal serial bus (USB)), the operation system (e.g., Windows XP) of the host system mounts the external storage apparatus on a mount point for accessing by the operation system or other application programs that are not built-in the operation system. In particular, a tool application program developed by a manufacturer of this external storage apparatus is capable of transmitting a small computer system interface (SCSI) command to the external storage apparatus via this mount point to set the configurations of the external storage apparatus according to a user's desire. For example, the user can set the storage property of a partition of the external storage apparatus as the write protect mode that forbids data to be written or a writable mode that allows data to be written.

However, because of security reasons, when a user logins the operation system for using the host system with a limited user authority mode (e.g., a guest mode of the Windows operation system), the operation system forbids an application program that is not built-in the operation system to transmit a SCSI command to the external storage apparatus. Accordingly, when a user operates the external storage apparatus through the host system with the limited user authority mode, the user can not manage the external storage apparatus by an application program that is not built-in the operation system. For example, under a case where the storage property of the external storage apparatus is set as the write protect mode, a user which logins the operation system with the limited user authority mode can not re-set the storage property of the external storage apparatus as the writable mode by using an application program developed by the manufacturer producing the external storage apparatus. Accordingly, it causes inconveniences for a user which logins the operation system with the limited user authority mode.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data access method and a data access system, which are capable of writing data into a storage apparatus being at a write protect mode when a user logins an operation system of a host system with a limited user authority mode.

The present invention is directed to a storage medium controller, which is capable of identifying a command from a host system and re-setting the configurations of a storage apparatus when a user logins an operation system of the host system with a limited user authority mode.

The present invention is directed to a storage system, which is capable of identifying a command from a host system and re-setting the configurations of a storage apparatus when a user logins an operation system of the host system with a limited user authority mode.

According to an exemplary embodiment of the present invention, a data access method for writing data into a storage apparatus is provided, wherein the storage apparatus has a storage unit, the storage unit has a plurality of physical blocks, a plurality of logical blocks mapped to the physical blocks are divided into at least a first partition, the storage property of the first partition is set as a write protect mode and the storage apparatus is coupleable to a host system having an operation system. The data access method includes transmitting a first command complied with a human interface device protocol to the storage apparatus via a human interface device path of the host system. The data access method also includes determining whether the first command is received by the storage apparatus; and setting the storage property of the first partition as a writable mode in response to the first command by the storage apparatus when the first command is received. The data access method still includes storing first data into the first partition by using built-in commands of the operation system of the host system. And, the data access method further receiving a second command complied with a mass storage device protocol and writing the first data into the first partition in response to the second command by the storage apparatus.

According to an exemplary embodiment of the present invention, a data access system including a host system and an external storage apparatus is provided. The host system has a built-in storage apparatus, wherein the built-in storage apparatus is installed with an operation system and an update tool, and the update tool is configured for transmitting a first command complied with a human interface device protocol via a human interface device path. The external storage apparatus includes a connector, a storage unit and a storage medium controller. The connector is configured to couple to the host system. The storage unit has a plurality of physical blocks, the physical blocks are mapped to a plurality of logical blocks, and the logical blocks are divided into at least a first partition. The storage medium controller is coupled to the storage unit and configured for determining whether the first command is received and setting the storage property of the first partition as a writable mode in response to the first command when the first command is received. Additionally, the update tool is configured for storing first data into the first partition by using built-in commands of the operation system and the storage medium controller is configured for receiving a second command complied with a mass storage device protocol and writing the first data into the first partition in response to the second command.

According to an exemplary embodiment of the present invention, a storage medium controller for managing a storage unit is provided, wherein the storage unit has a plurality of physical blocks, a plurality of logical blocks mapped to the physical blocks are divided into at least a first partition, the storage property of the first partition is set as a write protect mode. The storage medium controller includes a storage medium interface, a host interface and a storage medium management circuit. The storage medium interface is configured for coupling to the storage unit. The storage medium circuit is coupled to the storage medium interface and the host interface, and configured for receiving a first command complied with a human interface device protocol and setting the storage property of the first partition as a writable mode in response to the first command. Additionally, the storage medium management circuit is further configured for receiving a second command complied with a mass storage device protocol and writing first data into the first partition in response to the second command.

According to an exemplary embodiment of the present invention, a storage system including a connector, a storage unit and a storage medium controller is provided. The storage unit has a plurality of physical blocks, the physical blocks are mapped to a plurality of logical blocks, and the logical blocks are divided into at least a first partition, wherein the storage property of the first partition is set as a write protect mode. The storage medium controller is coupled to the storage unit and the connector, and configured for receiving a first command complied with a human interface device protocol and setting the storage property of the first partition as a writable mode in response to the first command. Additionally, the storage medium controller is further configured for receiving a second command complied with a mass storage device protocol and writing the first data into the first partition in response to the second command.

According to an exemplary embodiment of the present invention, a data access method for writing data into a storage apparatus is provided, wherein the storage apparatus has a storage unit, the storage unit has a plurality of physical blocks, a plurality of logical blocks mapped to the physical blocks are divided into at least a first partition, and the storage property of the first partition is set as a write protect mode. The data access method includes transmitting a first command to the storage apparatus through a human interface device path to set the storage property of the first partition as a writable mode. The data access method also includes transmitting a third command to the storage apparatus through the human interface device path to set the storage property of the first partition as the write protect mode.

Based on the above, the data access method, the data access system, the storage medium controller and the storage system of the present invention are capable of writing data into a storage unit which is set as a write protect mode when a user logins the operation system of a host system with a limited user authority mode.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
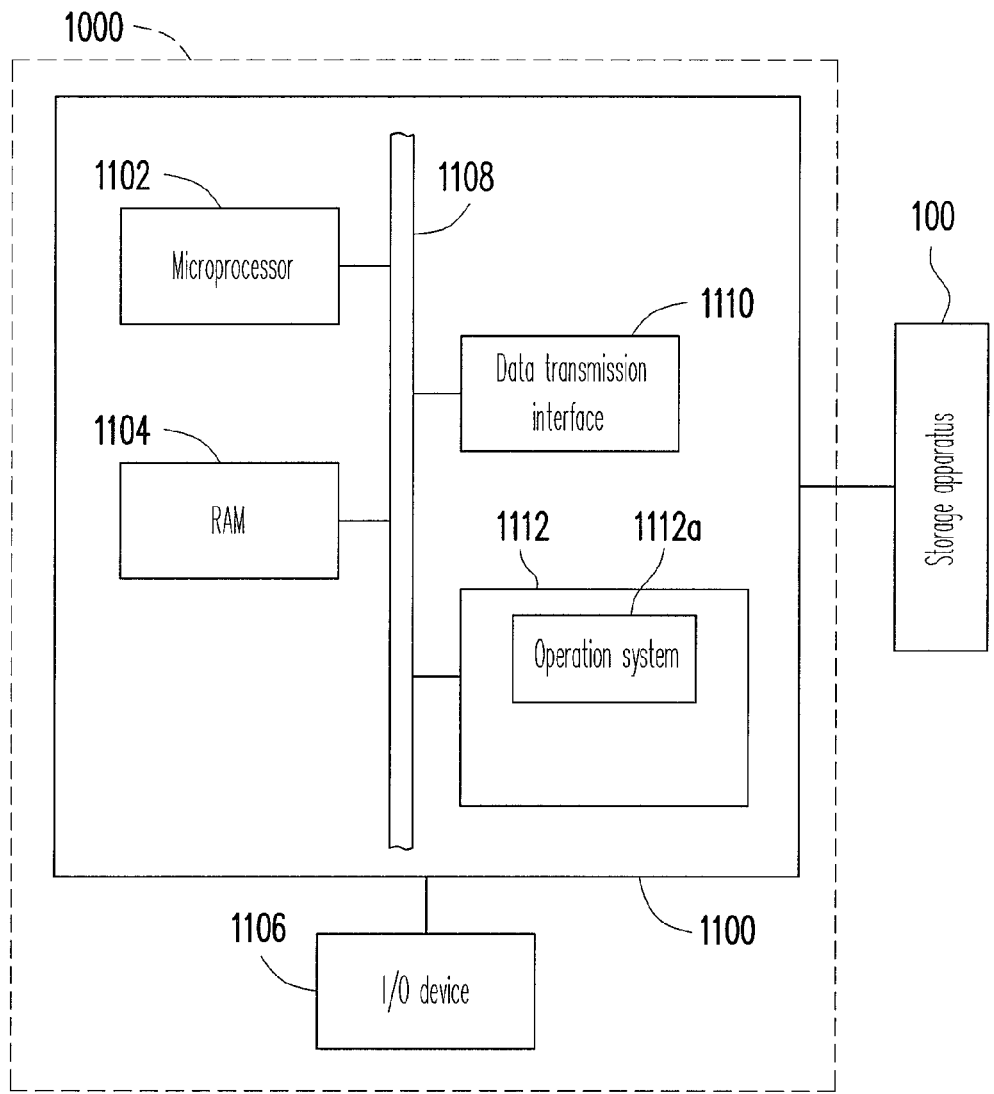
FIG. 1A is a schematic block diagram of a host system using a storage apparatus according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a schematic block diagram of a host system using a storage apparatus according to an exemplary embodiment of the invention.

Figure 1B:
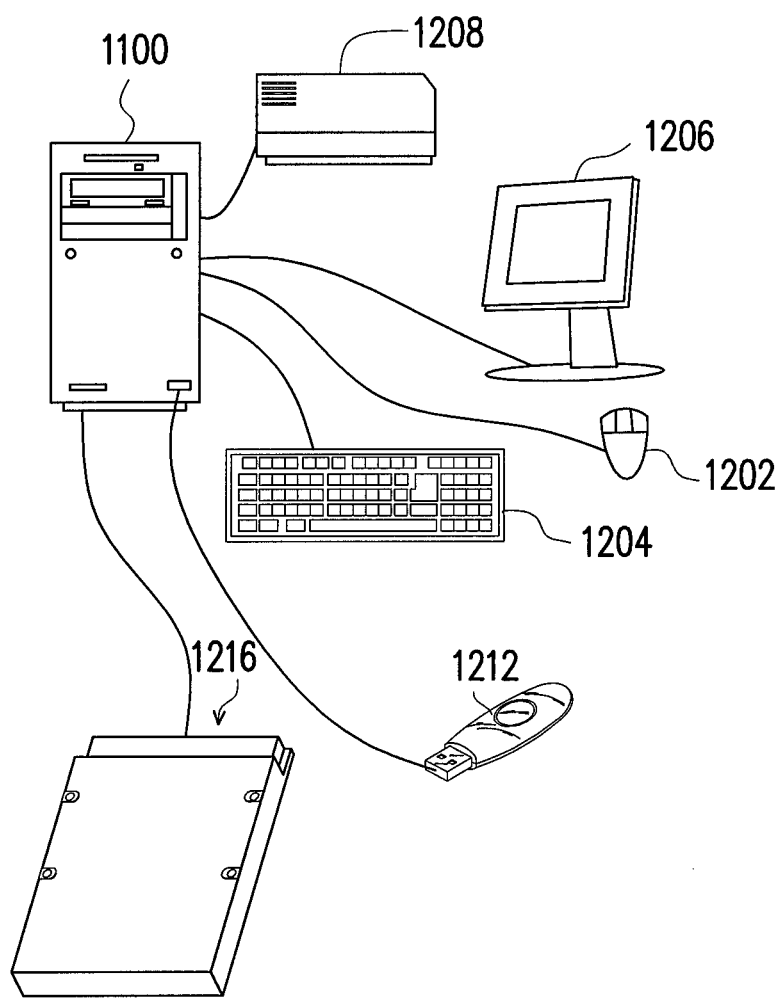
FIG. 1B is a diagram illustrating a computer, an input/output (I/O) device, and a storage apparatus according to the exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, a data transmission interface 1110 and a built-in storage apparatus 1112. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the exemplary embodiment of the present invention, a storage apparatus 100 is coupled to the devices of the host system 1000 through the data transmission interface 1110. The host system 1000 may write data into or read data from the storage apparatus 100 through co-operations of the CPU 1102, the RAM 1104, the I/O device 1106 and an operation system 1112a installed in the built-in storage apparatus 1112.

Figure 2:
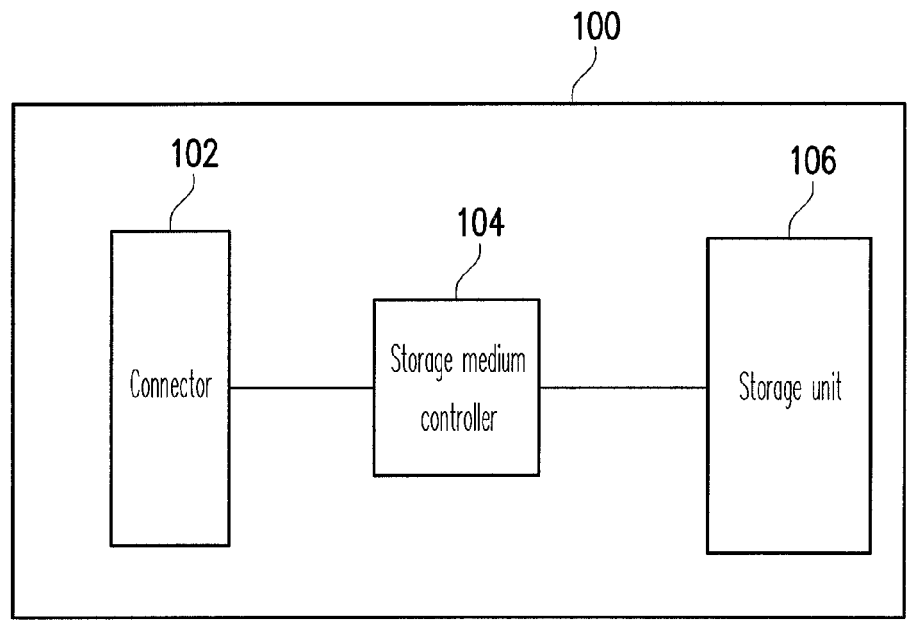
FIG. 2 is a schematic block diagram of the storage apparatus in FIG. 1A.

FIG. 2 is a schematic block diagram of the storage apparatus in FIG. 1A.

Referring to FIG. 2, in the present exemplary embodiment, the storage apparatus 100 is an external storage apparatus and is coupled to the host system 1000 in a removable manner. For example, the storage apparatus 100 may be a flash drive 1212 or a solid state drive (SSD) 1216, as shown in FIG. 1B. The storage apparatus 100 includes a connector 102, a storage medium controller 104 and a storage unit 106.

In the present exemplary embodiment, the connector 102 is a universal serial bus (USB) connector. However, it should be noticed that the present invention is not limited thereto and the connector 102 also can be an institute-of-electrical-and-electronic-engineers (IEEE) 1394 connector, a peripheral-component Interconnect-express (PCI Express) connector, a serial advanced technology attachment (SATA) connector, a secure digital (SD) interface connector, a memory stick (MS) interface connector, a multi-media-card (MMC) interface connector, a compact flash (CF) interface connector, an integrated-device-electronics (IDE) connector or other suitable type of connectors.

The storage medium controller 104 executes a plurality of logic gates or control instructions implemented in a hardware form or a firmware form and performs various data operations such as data writing, reading, and erasing in the storage unit 106 according to commands from the host system 1000. In particular, the storage medium controller 104 is configured for cooperating with the host system 1000 to execute a data access method and a memory management method of the present exemplary embodiment.

The storage unit 106 is coupled to the storage medium controller 104 and configured for storing data written by the host system 1000. In this exemplary embodiment, the storage unit 106 is a rewritable non-volatile memory. For example, the storage unit 106 is a multi-level cell (MLC) NAND flash memory module. However, the present invention is not limited thereto, and the storage unit 106 may also be a single level cell (SLC) NAND flash memory module, other flash memory module or other memory module having the same characteristic. Additionally, in another exemplary embodiment of the invention, the storage unit 106 may be a magnetic storage module or other storage module.

Figure 3:
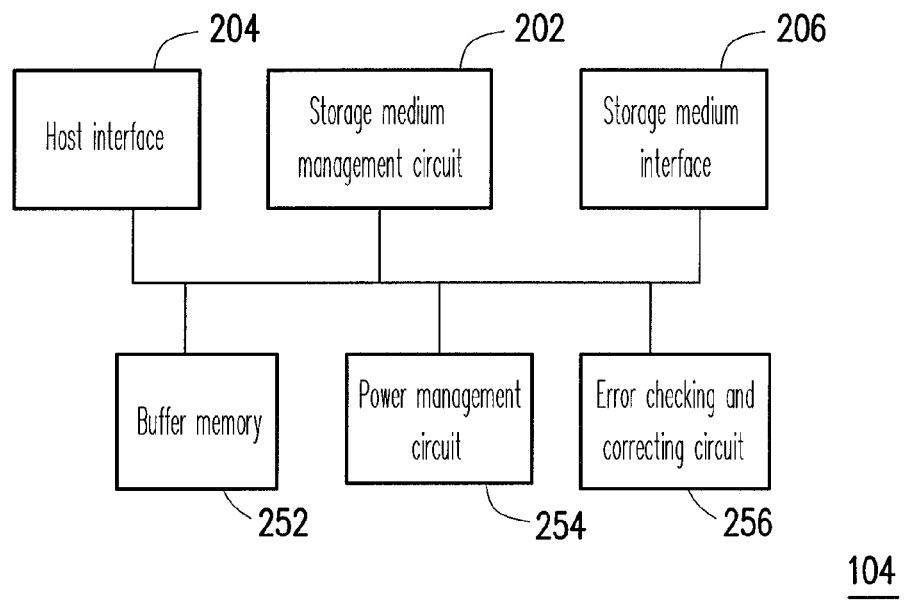
FIG. 3 is a schematic block diagram illustrating a storage medium controller according to an exemplary embodiment of the present invention.

FIG. 3 is a schematic block diagram illustrating a storage medium controller according to an exemplary embodiment of the present invention.

Referring FIG. 3, the storage medium controller 104 includes a storage medium management circuit 202, a host interface 204 and a storage medium interface 206.

The storage medium management circuit 202 is configured for controlling the whole operation of the storage medium controller 104. To be specific, the storage medium management circuit 202 has a plurality of control instructions, and the control instructions are executed to manage the storage unit 106 according to the data access method and the memory management method of the present exemplary embodiment when the storage apparatus 100 is at operations. The data access method and the memory management method will be described with drawings in the following.

In the present exemplary embodiment, the control instructions of the storage medium management circuit 202 are implemented in a firmware form. For example, the storage medium management circuit 202 has a micro-processor unit (not shown) and a read-only memory (not shown), and these control instructions are burned in the read-only memory. When the storage apparatus 100 is at operations, the control instructions are executed by the micro-processor unit to cooperate with the host system 1000 to accomplish the data access method and the memory management method according to the present exemplary embodiment.

In another exemplary embodiment, control instructions of the storage medium management circuit 202 also can be stored in specific addresses of the storage unit 106 as program codes. Additionally, the storage medium management circuit 202 may have a micro-processor unit (not shown), a read-only memory (not shown) and a random access memory (not shown). And, the read-only memory has a driver code, and when the storage medium controller 104 is enabled, the micro-processor unit executes the driver code to load the control instructions of the storage medium management circuit 202 stored in the storage unit 106 into the random access memory of the storage medium management circuit 202. Then, the micro-processor unit runs these control instructions to cooperate with the host system 1000 to accomplish the data access method and the memory management method of the exemplary embodiment of the present invention. Additionally, the control instructions of the storage medium management circuit 202 may be implemented in a hardware form.

The host interface 204 is coupled to the storage medium management circuit 202, and configured for receiving and identifying commands and data from the host system 1000. Namely, the commands and data from the host system 1000 are transmitted to the storage medium management circuit 202 through the host interface 204. In the present exemplary embodiment, the host interface 204 is a USB interface corresponding to the connector 102. However, it should be understood that the invention is not limited thereto, and the host interface 204 may be a PATA interface, a SATA interface, an IEEE 1394 interface, a PCI express interface, a SD interface, a MS interface, a MMC interface, a CF interface, an IDE interface, or other suitable data transmission interfaces.

The storage medium interface 206 is coupled to the storage medium management circuit 202 and configured for accessing the storage unit 106. That is, the data to be written into the storage unit 106 is transformed to a format acceptable to the storage unit 106 by the storage medium interface 206.

In another exemplary embodiment of the present invention, the storage medium controller 104 still includes a buffer memory 252. The buffer memory 252 is coupled to the storage medium management circuit 202 and configured to temporarily store data and commands from the host system 1000 or data from the storage unit 106.

In another exemplary embodiment of the present invention, the storage medium controller 104 still includes a power management circuit 254. The power management circuit 254 is coupled to the storage medium management circuit 202 and configured for controlling the power of the storage apparatus 100.

In another exemplary embodiment of the present invention, the storage medium controller 104 still includes an error checking and correcting circuit 256. The error checking and correcting circuit 256 is coupled to the storage medium management circuit 202, and configured for executing an error checking and correcting procedure to ensure data accuracy. To be specific, when the storage medium management circuit 202 receives a write command from the host system 1000, the error checking and correcting circuit 256 generates an error checking and correcting (ECC) code for data corresponding to the write command, and the storage medium management circuit 202 writes the data and the corresponding ECC code into the storage unit 106. Subsequently, when the storage medium management circuit 202 reads the data from the storage unit 106, the storage medium management circuit 202 simultaneously reads the corresponding ECC code, and the error checking and correcting circuit 256 executes the ECC procedure for the read data based on the corresponding ECC code.

Figure 4:
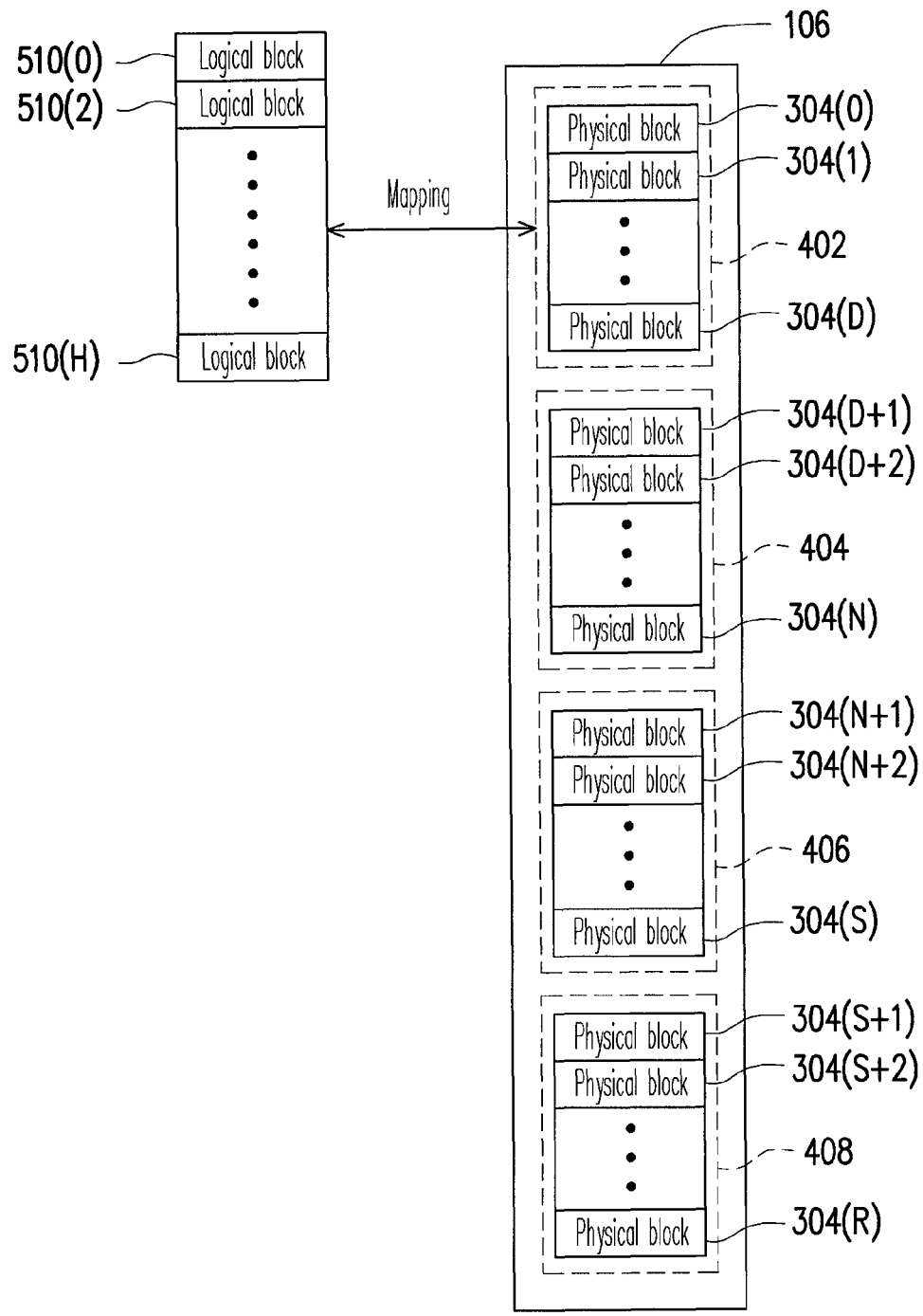
FIG. 4 is a schematic block diagram illustrating a storage unit according to an exemplary embodiment of the present invention.

FIG. 4 is a schematic block diagram illustrating a storage unit according to an exemplary embodiment of the present invention.

Referring to FIG. 4, the storage unit 106 includes physical blocks 304-(0)~304-(R). Each of the physical blocks has a plurality of physical pages, wherein the physical pages belonging to the same physical block can be written individually and must be erased simultaneously. In detail, each physical block is the smallest erasing unit. Namely, each physical block contains the least number of memory cells that are erased together. And, one physical page is the smallest programming unit. Namely, each physical page is the smallest unit for writing data.

In the present exemplary embodiment, the storage medium management circuit 202 logically groups the physical blocks 304(0)~304(R) of the storage unit 106 into a data area 402, a spare area 404, a system area 406 and a replacement area 408.

The physical blocks of the data area 402 and the spare area 404 are used for storing data written by the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks.

The physical blocks logically belonging to the system area 406 are used for recording system data, which includes information related to the manufacturer and a model of the storage unit, the number of the physical blocks in the storage unit, the number of the physical pages in each physical block, and so forth.

The physical blocks logically belonging to the replacement area 408 are replacement physical blocks. For example, when the storage unit 106 is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block (i.e., the bad block). Thus, if there are still normal physical blocks in the replacement area 408 and a physical block is damaged, the storage medium management circuit 202 gets a normal physical block from the replacement area 408 for replacing the damaged physical block. If there is no more normal physical block in the replacement area 408 and a physical block is damaged, the storage apparatus 100 is declared as being in a write-protect status (i.e., the storage medium management circuit 202 sets the storage property of the storage apparatus 100 as the write protect mode) and cannot be used for writing data anymore.

It has to be understood that the grouping relationships of grouping the physical blocks into the data area 402, the spare area 404, the system area 406 and the replacement area 408 are dynamically changed during the operations of the storage apparatus 100. For example, when a physical block of the spare area 404 is damaged and replaced by a physical block of the replacement area 408, the physical block of the replacement area 408 is associated with the spare area 404.

As described above, the physical blocks of the data area 402 and the spare area 404 are alternated to store data written by the host system 1000. In the present exemplary embodiment, the storage medium management circuit 202 informs the host system 1000 that the storage apparatus 100 is a composite device equipped with a human interface device and a mass storage device. Additionally, the storage medium management circuit 202 configures logical blocks 510(0)~510(H) for the host system 1000 to properly access data in the physical blocks that store data with the above-mentioned alternate manner. For example, when the storage apparatus 100 is initiated (e.g., formatted), the logical blocks 510(0)~510(H) map to the physical blocks 304(0)~304(D) of the data area 402, respectively. That is, one logical block maps to one physical block in the data area 402. Herein, the storage medium management circuit 202 establishes a logical block-physical block mapping table for recoding mapping relationships between the logical blocks and the physical blocks.

Figure 5:
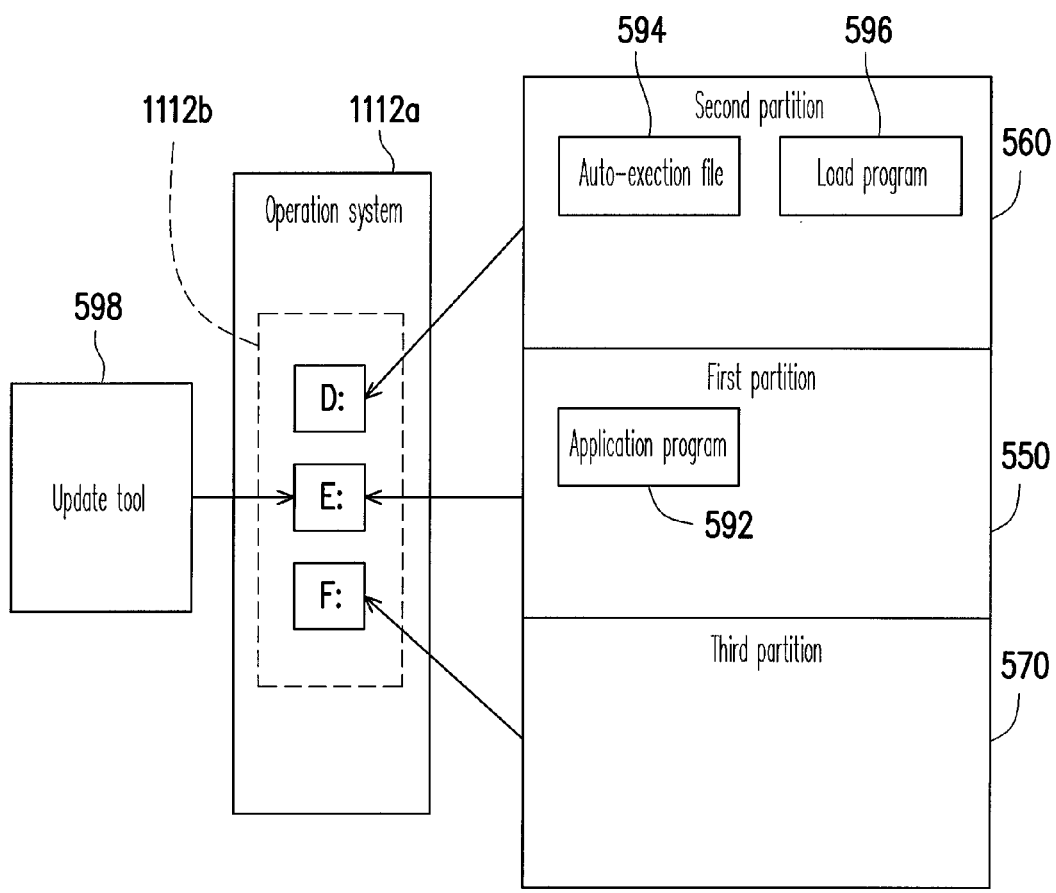
FIG. 5 is a diagram illustrating an example of managing logical blocks according to an exemplary embodiment of the present invention.

FIG. 5 is a diagram illustrating an example of managing logical blocks according to an exemplary embodiment of the present invention.

Referring to FIG. 5, the logical blocks 510(0)~510(H) are divided into a first partition 550 and a second partition 560. For example, the logical blocks 510(0)~510(D1) belong to the second partition 560, and the logical blocks 510(D+1)~510(D2) belong to the first partition 550.

Second data is stored in the first partition 550. For instance, the second data is an application program 592 developed by a manufacturer producing the storage apparatus 100. The application program 592 is configured for a user to operate the storage apparatus 100 or set the configurations of the storage apparatus 100. In particular, the storage medium management circuit 202 initially sets the storage property of the first partition 550 as the write protect mode (i.e., a read only mode). To be specific, when the storage apparatus 100 is coupled to the host system 1000, the storage medium management circuit 202 informs the host system 1000 that the first partition 550 is a partition belonging to a mass storage device and the host system 1000 is not allowed to write data into the first partition 550. It should be noted that the above-mentioned mass storage device means a storage device, wherein the capacity of the storage device may be any value and the storage device may include a removable medium or a non-removable medium.

The second partition 560 is a multimedia partition. To be specific, when the storage apparatus 100 is coupled to the host system 1000, the storage medium management circuit 202 informs the host system 1000 that the second partition 560 is a partition belonging to an optical storage device (also referred to a compact disc partition). For example, the second partition 560 is used for simulating a partition belonging to a compact disc drive, a digital video disc drive or a blue-ray disc drive. In particular, an auto-execution file 594 and a load program 596 are stored in the second partition 560. Herein, the auto-execution file 594 is a script file that is automatically executed by the operating system 1112a (e.g., the file name of this script file is "Autorun.inf") and the content of the auto-execution file 594 contains the description language for executing the load program 596. Furthermore, the load program 596 is configured for searching and executing the application program 592 in the first partition 550.

Besides the first partition 550 and the second partition 560, the formatted logical blocks 510(0)~510(H) further includes a third partition 570. For example, the third partition 570 is constituted of the logical blocks 510(D2+1)~510(H).

For example, the third partition 570 is a general storage partition and the storage medium management circuit 202 initially sets the storage property of the third partition 570 as the writable mode. To be specific, when the storage apparatus 100 is coupled to the host system 1000, the storage medium management circuit 202 informs the host system 1000 that the third partition 570 is a partition belonging to a mass storage device and the host system 1000 is allowed to write data into the third partition 570.

In the present exemplary embodiment, when the storage apparatus 100 is coupled to the host system 1000, the operation system 1112a gives query commands to the storage apparatus 100 for querying the device characteristics of the storage apparatus 100. Then the operation system 1112a configures a human interface device path and mount points 1112b and respectively mounts the first partition 550, the second partition 560 and the third partition 570 on the corresponding mount points according to responses from the storage medium management circuit 202. For example, taking Microsoft Windows as an example, the mount point is a drive letter mapping to a designated device. For example, taking Mac as an example, the mount point is an address in a system directory (e.g., a driver interface or an UNIX mount point). For example, the operation system 1112a configures the mount point "D:" for the second partition, the mount point "E:" for the first partition 550 and the mount point "F:" for the third partition 570. In particular, when the storage apparatus 100 is coupled to the host system 1000, the operation system 1112a recognizes an optical storage device simulated by using the second partition 560 and executes the auto-execution file 594 stored in the optical storage device (i.e., the second partition 560) based on the mount point "D:". Then, the auto-execution file 594 executes the load program 596 and thereby the load program 596 searches and executes the application program 592 stored in the first partition 550 based on the mount point "E:". Namely, when the storage apparatus 100 is coupled to the host system 1000, the application program 592 is executed automatically.

In the present exemplary embodiment, an update tool 598 is stored in the built-in storage apparatus 1112 of the host system 1000, wherein the update tool 598 could be implemented by a software, firmware, or hardware. The update tool 598 is configured for transmitting a first command complied with a human interface device protocol to the storage apparatus 100 via the mount point "E:" corresponding to the first partition through a human interface device path. In particular, the storage medium management circuit 202 sets the storage property of the first partition 550 as the writable mode in response to the first command. In the present exemplary embodiment, the human interface device path is a manner for addressing a human interface device by the host system. By the human interface device path, a command is transmitted correctly to designated human interface equipment.

To be specific, when a user logins the operation system 1112a for using the host system 1000 with the limited user authority mode (e.g., a guest mode of the Windows operation system), the operation system 1112a forbids an application program that is not built-in the operation system 1112a to directly transmit a mass storage device command (e.g., a SCSI command or a IDE/ATA command) to the storage apparatus 100 via the mount point. Because the human interface device path generally is used to transmit data for a keyboard or a mouse, the operation system 1112a could not prohibit data transmissions on the human interface device path even though the user logins the operation system with the limited user authority mode. Accordingly, the storage medium management circuit 202 is capable of receiving the first command from the host system 1000 and setting the storage property of the first partition 550 as the writable mode in response to the first command.

Under the situation where the storage property of the first partition 550 is set as the writable mode, new data (for example, first data that is different from the second data) may be stored into the first partition 550 by using the built-in commands (e.g., a copy command, a paste command, and etc.) of the operation system 1112a or data stored in the first partition is updated by using the built-in commands of the operation system 1112a. To be specific, when new data is stored into the first partition 550 by using the built-in commands of the operation system 1112a, the host system 1000 transmits a command complied with a mass storage device protocol to the storage apparatus 100 and the storage medium management circuit 202 writes the new data into the physical blocks mapped to the first partition 550 according to this command. For example, a new version (not shown) for replacing the application program 592 may be stored into the first partition 550 by the built-in commands of the operation system 1112a.

Figure 6:
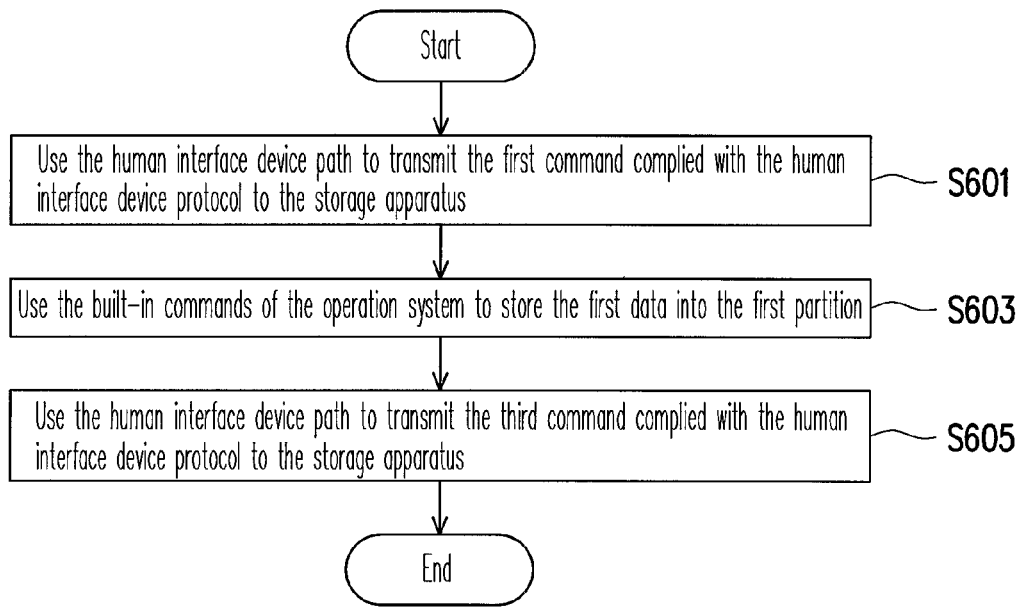
FIG. 6 is a flowchart illustrating an operation of an update tool according to an exemplary embodiment of the present invention.

FIG. 6 is a flowchart illustrating an operation of an update tool according to an exemplary embodiment of the present invention.

Referring to FIG. 6, in step S601, the update tool 598 uses the human interface device path to transmit the first command complied with the human interface device protocol to the storage apparatus 100, such that the storage property of the first partition 550 is set as the writable mode.

After that, in step S603, the update tool 598 uses the built-in commands of the operation system 1112a to store the first data into the first partition 550.

Finally, in step S605, the update tool 598 uses the human interface device path to transmit the third command complied with the human interface device protocol to the storage apparatus 100, such that the storage property of the first partition 550 is set as the write protect mode.

Figure 7:
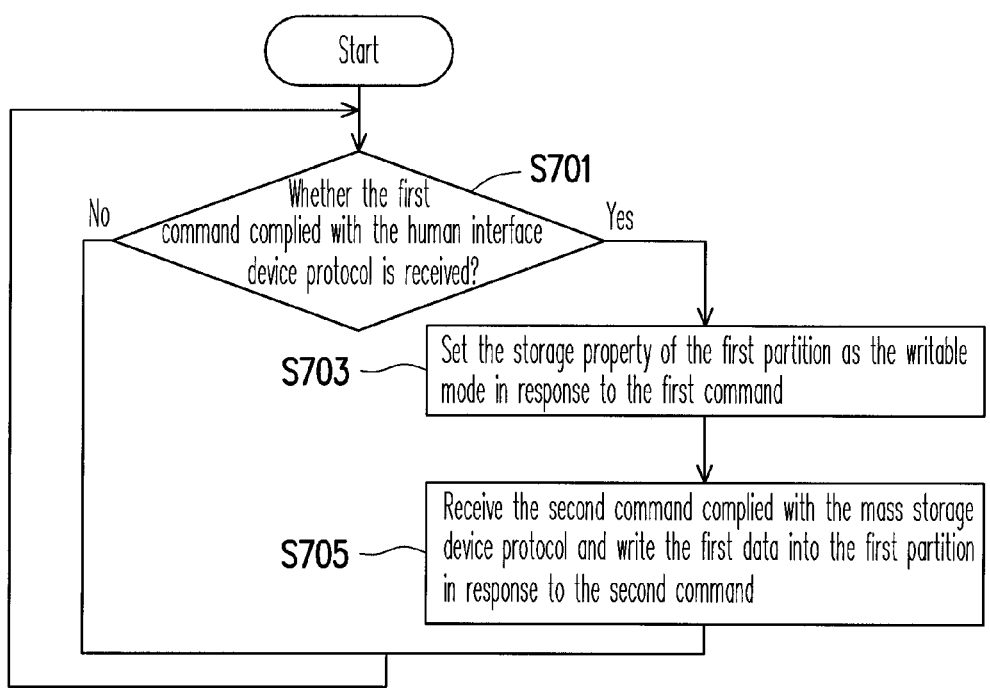
FIG. 7 is a flowchart illustrating an operation of the storage apparatus based on a command transmitted by the update tool according to an exemplary embodiment of the present invention.

FIG. 7 is a flowchart illustrating an operation of the storage apparatus based on a command transmitted by the update tool according to an exemplary embodiment of the present invention.

Referring FIG. 7, in step S701, the storage medium management circuit 202 of the storage medium controller 104 determines whether the first command complied with the human interface device protocol is received.

When the first command complied with the human interface device protocol is not received, step S701 is executed for waiting for a command from the host system 1000.

When the first command complied with the human interface device protocol is received, in step S703, the storage medium management circuit 202 sets the storage property of the first partition 550 as the writable mode in response to the first command.

Then, in step S705, the storage medium management circuit 202 receives the second command complied with the mass storage device protocol and writes the first data into the first partition in response to the second command.

Additionally, when the update tool 598 transmits the third command complied with the human interface device protocol to the storage apparatus 100 via the mount point "E:" corresponding to the first partition through the human interface device path, the operation shown in FIG. 7 further includes setting the storage property of the first partition 550 as the write protect mode in response to the third command.

In the present exemplary embodiment, the update tool 598 is downloaded from a download point provided by the manufacturer via an internet and stored in the built-in storage apparatus 1112. Additionally, in another exemplary embodiment, the update tool 598 is also pre-stored in the first partition 550 and copied into the built-in storage apparatus 1112 for executing by a user.

Figure 8:
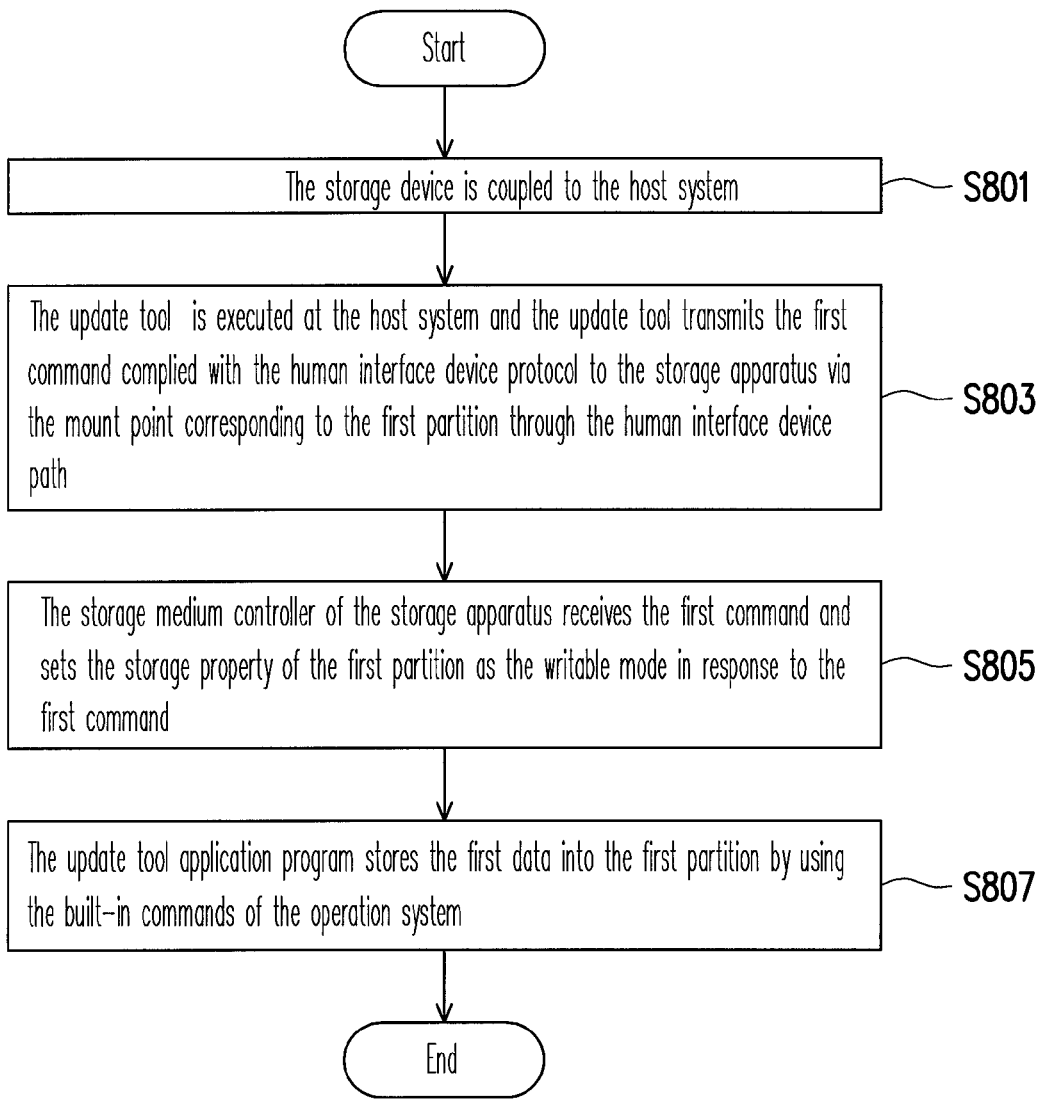
FIG. 8 is a flowchart illustrating the data access method according to an exemplary embodiment of the present invention.

FIG. 8 is a flowchart illustrating the data access method according to an exemplary embodiment of the present invention.

Referring to FIG. 8, in step S801, the storage device 100 is coupled to the host system 1000.

In step S803, the update tool 598 is executed at the host system 1000 and the update tool 598 transmits the first command complied with the human interface device protocol to the storage apparatus 100 via the mount point corresponding to the first partition through the human interface device path.

Then, in step S805, the storage medium controller 104 of the storage apparatus 100 receives the first command and sets the storage property of the first partition 550 as the writable mode in response to the first command.

After that, in step S807, the update tool 598 stores the first data into the first partition 550 by using the built-in commands of the operation system 1112a.

It should be noted that in the case where the first data is a new version for replacing the application program 592 stored in the first partition 550, because the application program 592 is run automatically through the auto-execution file 594 and the load program 596, the application program 592 is needed to close for preventing an access failure before executing step S807.

In another exemplary embodiment, the data access method shown in FIG. 8 further includes executing the update tool 598 at the host system 1000 to transmit the third command complied with the human interface device protocol to the storage apparatus 100 via the mount point corresponding to the first partition through the human interface device path after step S807, and receiving the third command by the storage medium controller 104 of the storage apparatus 100 and setting the storage property of the first partition 550 as the write protect mode in response to the third command. Accordingly, after the data stored in the first partition 550 is updated and the storage property of the first partition 550 is set as the write protect mode, the storage medium controller 104 can not allow the host system 1000 to write data into the first partition 550, thereby preventing the data stored in the first partition 550 from being mistakenly deleted.

Based on the above, the data access method according to the exemplary embodiment of the present invention transmits a command complied with the human interface device protocol through the human interface device path for instructing the storage medium controller of the storage apparatus to set the storage property of a partition, which originally is set as the write protect mode, as the writable mode and writes data to be updated into the partition by using the built-in commands of the operation system. Accordingly, when a user logins the operation system for using the host system with the limited user authority mode, the user still updates successfully data stored in the partition, which is set as the write protect mode. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data access method, for writing data into a storage apparatus, wherein the storage apparatus has a storage unit, the storage unit has a plurality of physical blocks, a plurality of logical blocks mapped to the physical blocks are divided into at least a first partition, a storage property of the first partition is set as a write protect mode and the storage apparatus is coupleable to a host system having an operation system, the data access method comprising:
   transmitting a first command complied with a human interface device protocol from the host system to the storage apparatus via a mount point corresponding to the first partition through a human interface device path of the host system;
   determining whether the first command is received by the storage apparatus;
   setting the storage property of the first partition as a writable mode in response to the first command by the storage apparatus if the first command is received;
   if at least one built-in command of the operation system of the host system is generated to indicate to store first data into the first partition, transmitting a second command complied with a mass storage device protocol from the host system to the storage apparatus via the mount point corresponding to the first partition; and
   receiving the second command complied and writing the first data into the first partition in response to the second command by the storage apparatus.

2. The data access method according to claim 1, further comprising:
   transmitting a third command complied with the human interface device protocol from the host system to the storage apparatus via the mount point corresponding to the first partition through the human interface device path;
   determining whether the third command is received by the storage apparatus; and
   setting the storage property of the first partition as the write protect mode in response to the third command by the storage apparatus.

3. The data accessing method according to claim 1, wherein the logical blocks are divided into at least the first partition, a second partition and a third partition,
   wherein the data access method further comprises simulating a compact disc partition by using the second partition and setting a storage property of the third partition as the writable mode.

4. The data access method according to claim 3,
   wherein the first data is an application program, and an auto-execution file and a load program are stored in the second partition,
   wherein the auto-execution file is executed automatically by the operation system of the host system,
   wherein the auto-execution file is configured to execute the load program and the load program is configured to execute the application program.

5. The data access method according to claim 1, wherein second data is stored in the first partition,
   wherein the step of storing the first data into the first partition by using the at least one built-in command of the operation system of the host system comprises:
   storing the first data into the first partition by using the at least one built-in command of the operation system of the host system to replace the second data.

6. A data access system, comprising:
a host system, having a built-in storage apparatus, wherein the built-in storage apparatus is installed with an operation system and an update tool; and
an external storage apparatus, comprising:
a connector, configured to couple to the host system;
a storage unit, having a plurality of physical blocks, at least a portion of the physical blocks are mapped to a plurality of logical blocks, and the logical blocks are divided into at least a first partition, wherein the update tool is configured to transmit a first command complied with a human interface device protocol from the host system to the external storage apparatus via a mount point corresponding to the first partition through a human interface device path of the host system; and
a storage medium controller, coupled to the storage unit and the connector, configured to:
determine whether the first command is received; and
set a storage property of the first partition as a writable mode in response to the first command if the first command is received,
wherein the update tool is further configured to store first data into the first partition by using at least one built-in command of the operation system,
wherein the storage medium controller is further configured to receive a second command complied with a mass storage device protocol via the mount point corresponding to the first partition and write the first data into the first partition in response to the second command.

7. The data access system according to claim 6,
wherein the update tool is further configured to transmit a third command complied with the human interface device protocol from the host system to the external storage apparatus via the mount point corresponding to the first partition through the human interface device path,
wherein the storage medium controller is further configured to determine whether the third command is received and set the storage property of the first partition as a write protect mode in response to the third command if the third command is received.

8. The data access system according to claim 6, wherein the logical blocks are divided into at least the first partition, a second partition and a third partition,
wherein the storage medium controller is further configured to simulate a compact disc partition by using the second partition and set a storage property of the third partition as the writable mode.

9. The data access system according to claim 8, wherein the first data is an application program,
wherein an auto-execution file and a load program are stored in the second partition,
wherein the operation system of the host system executes automatically the auto-execution file if the external storage apparatus is coupled to the host system,
wherein the auto-execution file is configured to execute the load program and the load program is configured to execute the application program.

10. The data access system according to claim 6, wherein second data is stored in the first partition,
wherein the update tool is configured to store the first data into the first partition by using the at least one built-in command of the operation system for replacing the second data.

11. The data access system according to claim 6, wherein each of the physical blocks has a plurality of physical pages and the physical pages belonging to the same physical block are written individually and are erased simultaneously.

12. A storage medium controller, for managing a storage unit, wherein the storage unit has a plurality of physical blocks, a plurality of logical blocks mapped to the physical blocks are divided into at least a first partition, a storage property of the first partition is set as a write protect mode, the storage medium controller:
a storage medium interface, configured for coupling to the storage unit;
a host interface, configured to couple to a host system; and
a storage medium controller, coupled to the storage medium interface and the host interface and configured to:
receive a first command complied with a human interface device protocol via a mount point corresponding to the first partition through a human interface device path of the host system;
set the storage property of the first partition as a writable mode in response to the first command; and
receive a second command complied with a mass storage device protocol via the mount point corresponding to the first partition and write first data into the first partition in response to the second command.

13. The storage medium controller according to claim 12, wherein the storage medium management circuit is configured to receive a third command complied with the human interface device protocol via the mount point corresponding to the first partition through the human interface device path of the host system and set the storage property of the first partition as the write protect mode in response to the third command.

14. The storage medium controller according to claim 12, wherein the logical blocks are divided into at least the first partition, a second partition and a third partition,
wherein the storage medium management circuit is further configured to simulate a compact disc partition by using the second partition and set a storage property of the third partition as the writable mode.

15. A storage system, comprising:
a connector configured to couple to a host system;
a storage unit, having a plurality of physical blocks, wherein a portion of the physical blocks map to a plurality of logical blocks, the logical blocks are divided into a first partition and a storage property of the first partition is set as a write protect mode; and
a storage medium controller, coupled to the storage unit and the connector and configured to:
receive a first command complied with a human interface device protocol via a mount point corresponding to the first partition through a human interface device path of the host system;
set the storage property of the first partition as a writable mode in response to the first command; and
receive a second command complied with a mass storage device protocol via the mount point corresponding to the first partition and write first data into the first partition in response to the second command.

16. The storage system according to claim 15, wherein the storage medium controller is configured to receive a third command complied with the human interface device protocol via the mount point corresponding to the first partition through the human interface device path of the host system and set the storage property of the first partition as the write protect mode in response to the third command.

17. The storage system according to claim 15, wherein the logical blocks are divided into at least the first partition, a second partition and a third partition,
  wherein the storage medium controller is further configured to simulate a compact disc partition by using the second partition and set a storage property of the third partition as the writable mode.

18. The storage system according to claim 17, wherein an application program is stored in the first partition, an auto-execution file and a load program are stored in the second partition, the auto-execution file is configured to execute the load program and the load program is configured to execute the application program.

19. The storage system according to claim 15, wherein each of the physical blocks has a plurality of physical pages and the physical pages belonging to the same physical block are written individually and are erased simultaneously.

20. A data access method, for writing data into a storage apparatus, wherein the storage apparatus has a storage unit, the storage unit has a plurality of physical blocks, a plurality of logical blocks mapped to the physical blocks are divided into at least a first partition, a storage property of the first partition is set as a write protect mode, the data access method comprising:
  transmitting a first command complied with a human device interface protocol from a host system to the storage apparatus via a mount point corresponding to the first partition through a human interface device path of the host system to set the storage property of the first partition as a writable mode; and
  transmitting a third command complied with the human device interface protocol from the host system to the storage apparatus via the mount point corresponding to the first partition through the human interface device path of the host system to set the storage property of the first partition as the write protect mode.

* * * * *